US012768523B2

(12) United States Patent
Li et al.

(10) Patent No.: US 12,768,523 B2
(45) Date of Patent: Oct. 20, 2026

(54) ADJUSTABLE DOWNLIGHT AND ADJUSTING METHOD THEREOF

(71) Applicant: Hengdian Group Tospo Lighting Co., Ltd., Dongyang (CN)

(72) Inventors: Tao Li, Dongyang (CN); Junchu Si, Dongyang (CN); Linlin Cheng, Dongyang (CN); Miao Han, Dongyang (CN); Heng Li, Dongyang (CN); Jinghang Zhou, Dongyang (CN); Hao Chen, Dongyang (CN); Wei Liu, Dongyang (CN)

(73) Assignee: Hengdian Group Tospo Lighting Co., Ltd., Dongyang (CN)

( * ) Notice: Subject to any disclaimer, the term of this patent is extended or adjusted under 35 U.S.C. 154(b) by 0 days.

(21) Appl. No.: 19/292,951

(22) Filed: Aug. 7, 2025

(65) Prior Publication Data

US 2026/0043536 A1 Feb. 12, 2026

(30) Foreign Application Priority Data

Aug. 8, 2024 (CN) ......................... 202411083671.9

(51) Int. Cl.

| | |
|---|---|
| ***F21V 21/04*** | (2006.01) |
| ***F21S 8/02*** | (2006.01) |
| ***F21V 7/04*** | (2006.01) |
| ***F21V 17/18*** | (2006.01) |
| ***F21V 29/70*** | (2015.01) |

(52) U.S. Cl.

CPC .............. *F21V 21/04* (2013.01); *F21S 8/026* (2013.01); *F21V 7/04* (2013.01); *F21V 17/18* (2013.01); *F21V 29/70* (2015.01)

(58) Field of Classification Search

CPC ................................. F21S 8/026; F21V 21/04

See application file for complete search history.

(56) References Cited

U.S. PATENT DOCUMENTS

| | | | | | |
|---|---|---|---|---|---|
| 4,232,361 | A * | 11/1980 | Kelsall | F21V 21/30 | 362/404 |
| 6,095,660 | A * | 8/2000 | Moriyama | F21S 8/038 | 362/147 |
| 7,431,482 | B1 * | 10/2008 | Morgan | F21S 2/005 | 362/249.07 |
| 2008/0112171 | A1 * | 5/2008 | Patti | F21V 21/04 | 362/372 |
| 2009/0268474 | A1 * | 10/2009 | Ward | F21V 21/04 | 362/364 |
| 2015/0276190 | A1 * | 10/2015 | Devlin | F21V 21/30 | 362/362 |
| 2017/0307193 | A1 * | 10/2017 | Fujisawa | F21V 27/00 | |
| 2019/0072258 | A1 * | 3/2019 | Tan | F21K 9/20 | |

* cited by examiner

*Primary Examiner* — Eric T Eide

(74) *Attorney, Agent, or Firm* — JMB Davis Ben-David

(57) ABSTRACT

A downlight is disclosed, including a cylindrical body. Springs are symmetrically connected to a side surface of the cylindrical body; a lamp body is provided inside the cylindrical body; a limiting ring is provided at an upper end inside the cylindrical body; a rotatable disk is provided above the limiting ring; the lamp body and the rotatable disk are connected through a connecting member; two ends of the connecting member are connected to the lamp body and the rotatable disk through friction pivots, respectively; and a upper cover is connected to an upper portion of the cylindrical body.

13 Claims, 12 Drawing Sheets

ADJUSTABLE DOWNLIGHT AND ADJUSTING METHOD THEREOF

CROSS-REFERENCE TO RELATED APPLICATION

Benefit is claimed to Chinese patent application No. 202411083671.9, filed Aug. 8, 2024, the entirety disclosure of which is herein incorporated by reference.

FIELD

The present disclosure pertains to the technical field of downlights, and in particular, relates to an adjustable downlight and an adjusting method thereof.

BACKGROUND

With the continuous improvement of people's living standards and aesthetic demands, downlights are increasingly used in homes. The downlight is a type of lighting fixture embedded in a ceiling or a suspended ceiling, featuring compact size and strong ambiance-creating capability.

There are some issues in practical applications of prior downlights, such as the inability to adjust the depth of anti-glare (the distance between the light source and the light exit), the inability to adjust an illumination angle, or the inability to adjust a light-emitting angle. Developing downlights with different functions would increase mold investment and associated storage costs for various models of downlights.

Therefore, there is an urgent need for a retractable and angle-adjustable downlight that endows the downlight with multiple functions while reducing the mold investment and storage costs.

SUMMARY

Described herein is a downlight, comprising a cylindrical body, wherein two springs are symmetrically connected to corresponding side surfaces of the cylindrical body; a lamp body is provided inside the cylindrical body; a limiting ring is provided at an upper interior portion of the cylindrical body; a rotatable disk is provided on a top of the limiting ring; the lamp body and the rotatable disk are connected through a connecting member; two ends of the connecting member are connected to the lamp body and the rotatable disk through corresponding friction pivots, respectively; an upper cover is connected to an upper portion of the cylindrical body, and the rotatable disk is rotatably positioned between the limiting ring and the upper cover.

DETAILED DESCRIPTION

Figure 1:
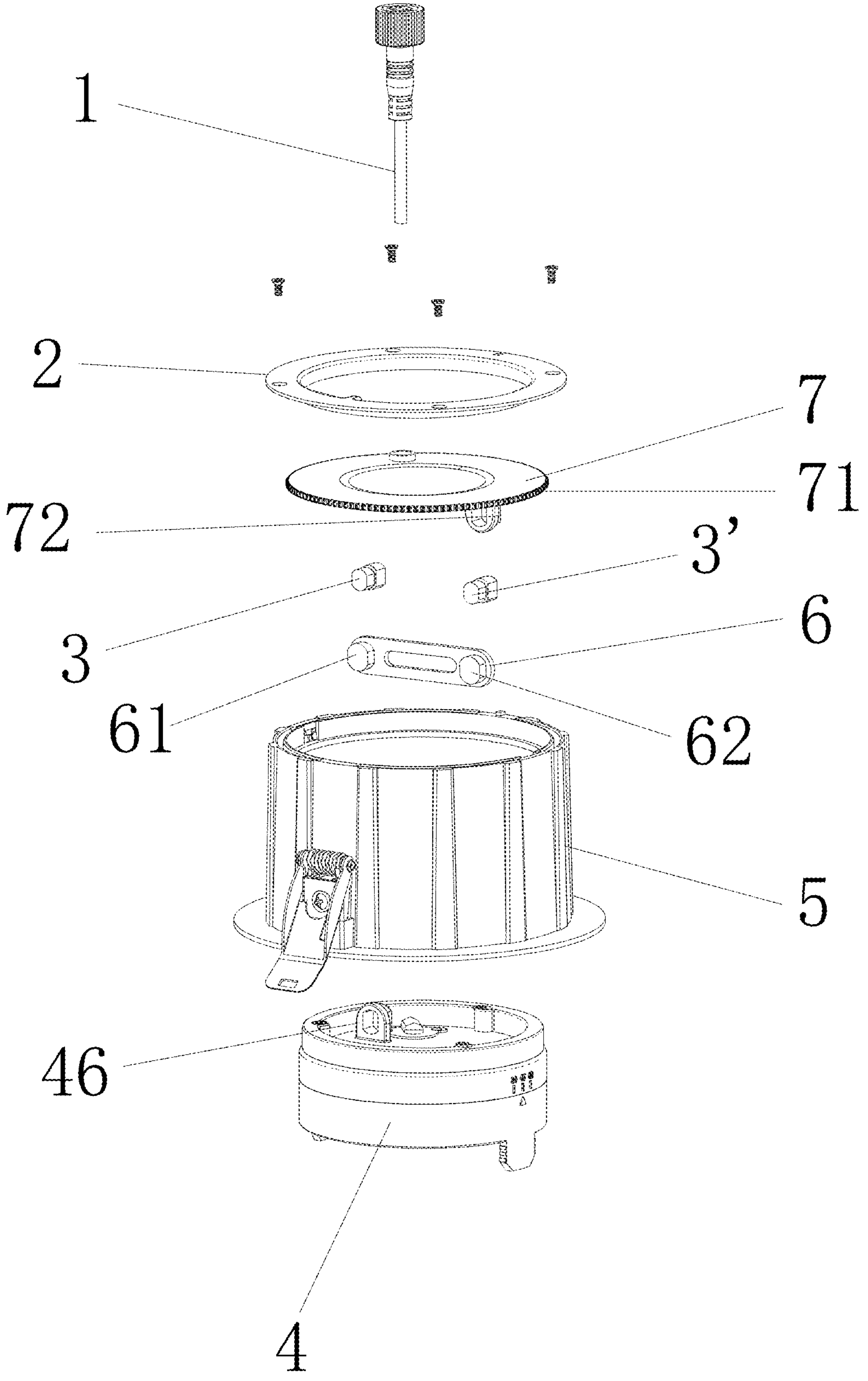
FIG. 1 is an exploded structural schematic diagram of the present disclosure.

An object of the present disclosure is to provide a downlight to solve at least one of the issues set forth in the above background. The present disclosure provides a downlight, which enables the downlight to have multiple functions while reducing mold investment and storage costs.

Another object of the present disclosure is to provide a method for adjusting the downlight.

In order to achieve the above object, the present disclosure provides the following technical solutions. A downlight is provided, including a cylindrical body, where two springs are symmetrically connected to corresponding side surfaces of the cylindrical body; a lamp body is provided inside the cylindrical body; a limiting ring is provided at an upper interior portion of the cylindrical body; a rotatable disk is provided on a top of the limiting ring; the lamp body and the rotatable disk are connected through a connecting member; two ends of the connecting member are connected to the lamp body and the rotatable disk through corresponding friction pivots, respectively; an upper cover is connected to an upper portion of the cylindrical body, and the rotatable disk is rotatably positioned between the limiting ring and the upper cover.

Further, in order to provide damping and to ensure the stability of an illumination direction after adjustment while offering feedback during adjustment, a plurality of friction teeth are provided on a circumference of the rotatable disk, a side wall of the cylindrical body, positioned above the limiting ring and corresponding to the circumference of the rotatable disk, is recessed inward to form a groove, and an elastic sheet is disposed within the groove and protrudes outward beyond the side wall to abut against the friction teeth.

Further, in order to adjust a light-emitting angle, the lamp body includes a heat sink; a reflection cup is connected to a bottom of the heat sink; a plurality of light source plate positioning blocks are provided at an upper inner portion of the reflection cup; a light source plate is provided within and limited by the light source plate positioning blocks; one or more inner-lens buckles are provided on a circumference of a lower end of the reflection cup; an inner lens is mounted to the reflection cup through the inner-lens buckles; and the reflection cup is further connected to a rotating lens body. The rotating lens body comprises a rotating cup capable of horizontally rotating; an outer lens corresponding to the inner lens is provided inside the rotating cup; a first limiting groove is provided on a circumference of the outer lens; and a first limiting block corresponding to the first limiting groove is connected to the rotating cup.

Further, in order to realize a connection between the rotating cup and the reflection cup and at the same time enable the rotating cup to rotate relative to the reflection cup, an upper end of an inner wall of the rotating cup is provided with a rotating cup buckle, and a circumference of the reflection cup is provided with one or more reflection cup buckles corresponding to the rotating cup buckle.

Further, in order to provide limiting and to ensure the stability of the light-emitting angle after adjustment while offering feedback during adjustment, the inner wall of the rotating cup is provided with one or more feedback grooves, and the circumference of the reflection cup is provided with feedback protrusions corresponding to the feedback grooves.

Further, in order to limit the rotational range of the rotating cup, a second limiting block is disposed at an upper portion of the rotating cup, and a second limiting groove corresponding to the second limiting block is provided on the heat sink.

Further, in order to facilitate a quick adjustment to a required light-emitting angle, angle marks are provided on a circumference of the heat sink, and indicating arrows corresponding to the angle marks are provided on the rotating cup.

Further, in order to fix the power cord on the heat sink and prevent detachment at a welding joint of the power cord and the light source plate when the lamp body is pulled downward, the light source plate is connected to a power cord, an inner top of the heat sink is connected to a power cord holder, and the power cord is fixed to the power cord holder.

Further, in the present disclosure, a method for adjusting the downlight is provided, including altering a vertical position of the lamp body via the connecting member to adjust a distance between a bottom surface of the lamp body and a bottom surface of the cylindrical body, thereby adjusting an anti-glare depth of the downlight.

Further, the method includes moving the lamp body downward through the connecting member until at least a portion of the lamp body is positioned beneath the bottom surface of the cylindrical body; and rotating the lamp body within a vertical plane by at least one of the friction pivots to adjust an illumination angle of the lamp body.

Further, the method includes rotating the lamp body within a horizontal plane via the rotatable disk to adjust an illumination direction of the lamp body.

Further, the method includes rotating the rotating cup to rotate the outer lens relative to the inner lens, thereby changing a relative position of the outer lens relative to the inner lens to adjust a light emission angle of the lamp body.

Compared with the prior art, the beneficial effects of the present disclosure are as follows.

In the present disclosure, the installation and position of the rotatable disk on the cylindrical body are achieved through the upper cover and the limiting ring. The two ends of the connecting member are connected to the lamp body and the rotatable disk through friction pivots, respectively, achieving the installation of the lamp body and the cylindrical body. This allows the lamp body to move up and down relative to the rotatable disk and the lamp body, thereby enabling the adjustment of the anti-glare depth.

In the present disclosure, the lamp body may be rotated in the vertical plane to adjust the illumination angle of the lamp body, enabling the downlight to achieve wall-washing lighting. Additionally, the lamp body also may be rotated in the horizontal plane to adjust the illumination direction of the lamp body, thereby achieving a wider range of applications.

In the present disclosure, damping for the rotation of the rotatable disk is provided by the engagement of the damping elastic sheets with the friction teeth, which not only ensures the stability of the illumination direction after adjustment but also offers feedback during adjustment.

In the present disclosure, the inner lens is connected to the lower end of the reflection cup, and the reflection cup is further connected to a rotatable rotating cup. The outer lens is connected to the rotating cup. By rotating the rotating cup horizontally, the outer lens is driven to rotate relative to the inner lens, thereby enabling the adjustment of the light-emitting angle.

In the present disclosure, the power cord holder is connected above the heat sink to fix the power cord on the heat sink, preventing detachment at a welding joint of the power cord and the light source plate when the lamp body is pulled downward.

In the present disclosure, a nightlight light source strip is connected to the circumference of the upper end of the heat sink. Additionally, a light guide ring enclosing the nightlight light source strip is connected to the heat sink, thereby providing the downlight with nightlight functionality.

The technical solutions in the embodiments of the present disclosure will be clearly and completely described below in conjunction with the drawings in the embodiments of the present disclosure. It is apparent that the described embodiments are merely a part of the embodiments of the present disclosure, rather than all embodiments. All other embodiments obtained by those of ordinary skill in the art based on the embodiments of the present disclosure without creative efforts shall fall within the protection scope of the present disclosure.

Embodiment 1

Referring to FIGS. 1 to 12, the present disclosure provides the following technical solutions. A downlight is provided, including a cylindrical body 5. A pair of springs 54 are symmetrically connected to the side surfaces of the cylindrical body 5, and the springs 54 are each connected to the face ring body 5 by a screw. A lamp body 4 is provided inside the cylindrical body 5. A limiting ring 51 is provided at an upper interior portion of the cylindrical body 5. A rotatable disk 7 is provided on top of the limiting ring 51.

The lamp body 4 and the rotatable disk 7 are connected through a connecting member 6. The rotatable disk 7 is provided with a first connecting portion 72 protruding downward, and the lamp body 4 is provided with a second connecting portion 46 protruding upward. A first end 61 and a second end 62 of the connecting member 6 are connected to the first connecting portion 72 of the rotatable disk 7 and the second connecting portion 46 of the lamp body 4 through a first friction pivot 3 and a second friction pivot 3', respectively, thereby establishing connections with the disk 7 and the lamp body 4. The connecting member 6 can pivot relative to the rotatable disk 7 around the first friction pivot 3, and the lamp body 4 can pivot relative to the connecting member 6 around the second friction pivot 3'. An upper cover 2 is connected to an upper portion of the cylindrical body 5, the rotatable disk 7 is rotatably positioned between the limiting ring 51 and the upper cover 2. The upper cover 2 is connected to the cylindrical body 5 by screws. A power cord 1 is connected to the lamp body 4.

By adopting the above technical solution, in the present disclosure, the positioning of the rotatable disk 7 on the cylindrical body 5 are achieved through the upper cover 2 and the limiting ring 51. Since the rotatable disk 7 can rotate circumferentially between the upper cover 2 and the limiting ring 51, and the lamp body 4 is connected to the rotatable disk 7 via the connecting member 6, the user can operate the lamp body 4 to rotate circumferentially in the horizontal plane by means of the circumferential rotation of the rotatable disk 7.

Figure 2:
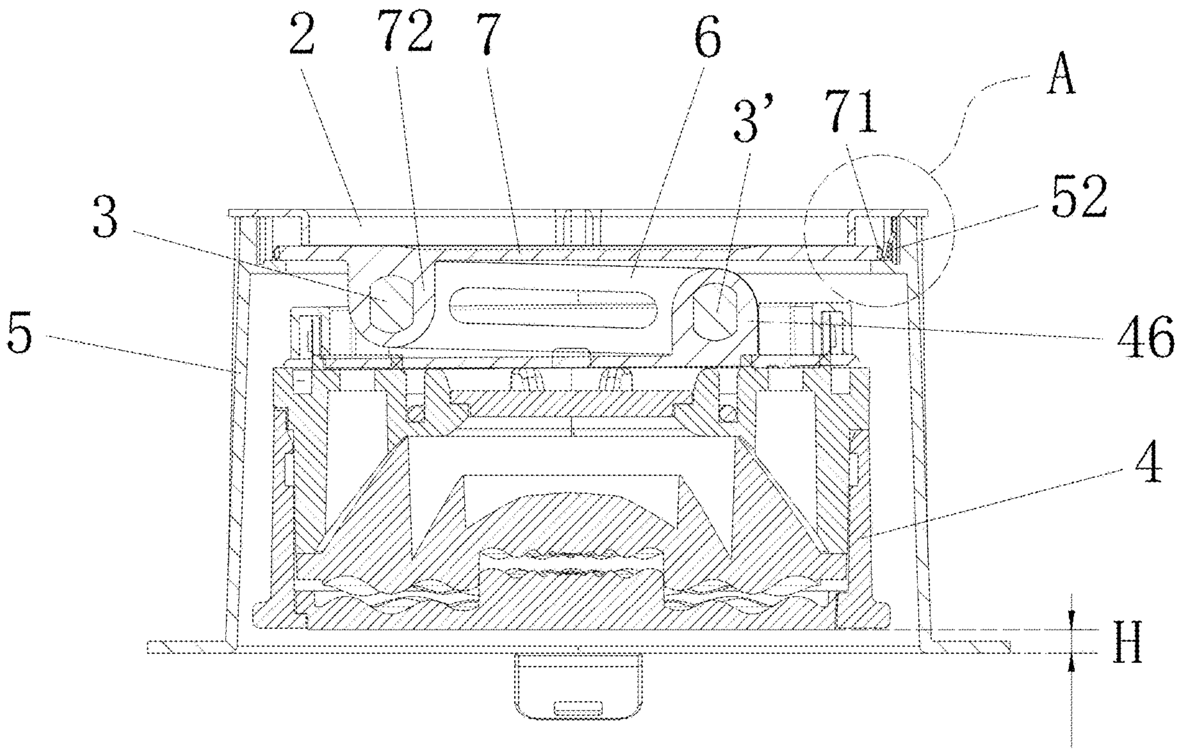
FIG. 2 is a schematic cross-sectional structural diagram of the present disclosure.
Figure 3:
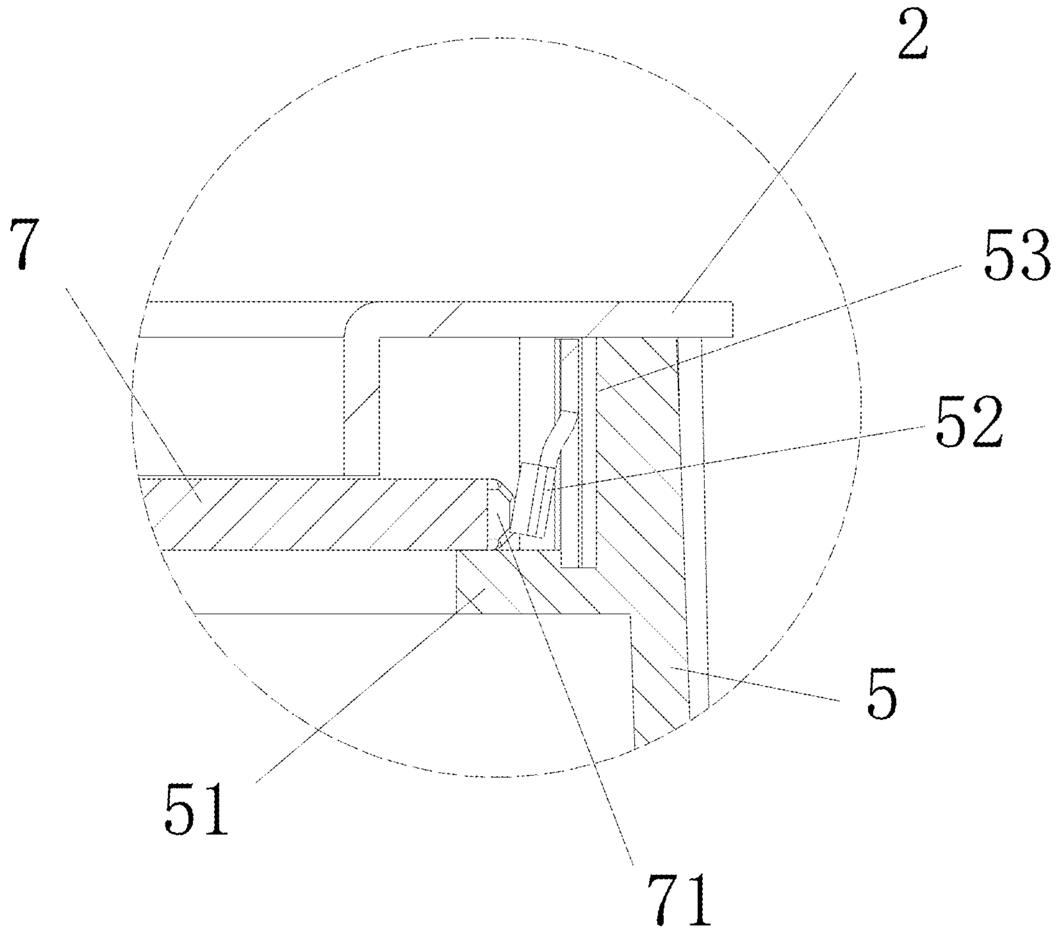
FIG. 3 is an enlarged schematic diagram of part A in FIG. 2.
Figure 4:
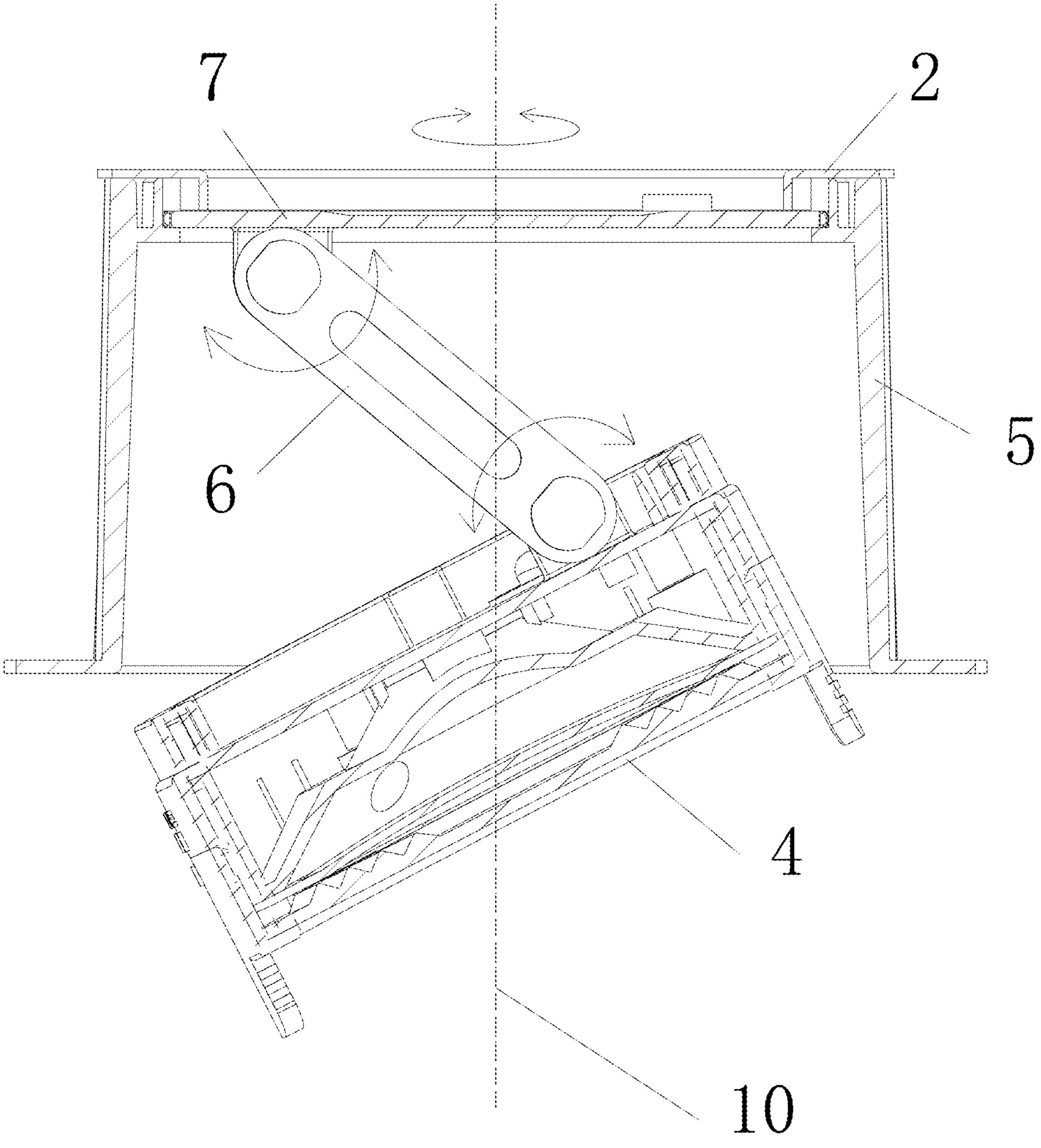
FIG. 4 is a schematic cross-sectional structural diagram of the present disclosure when a lamp body of the present disclosure is pulled downward.
Figure 5:
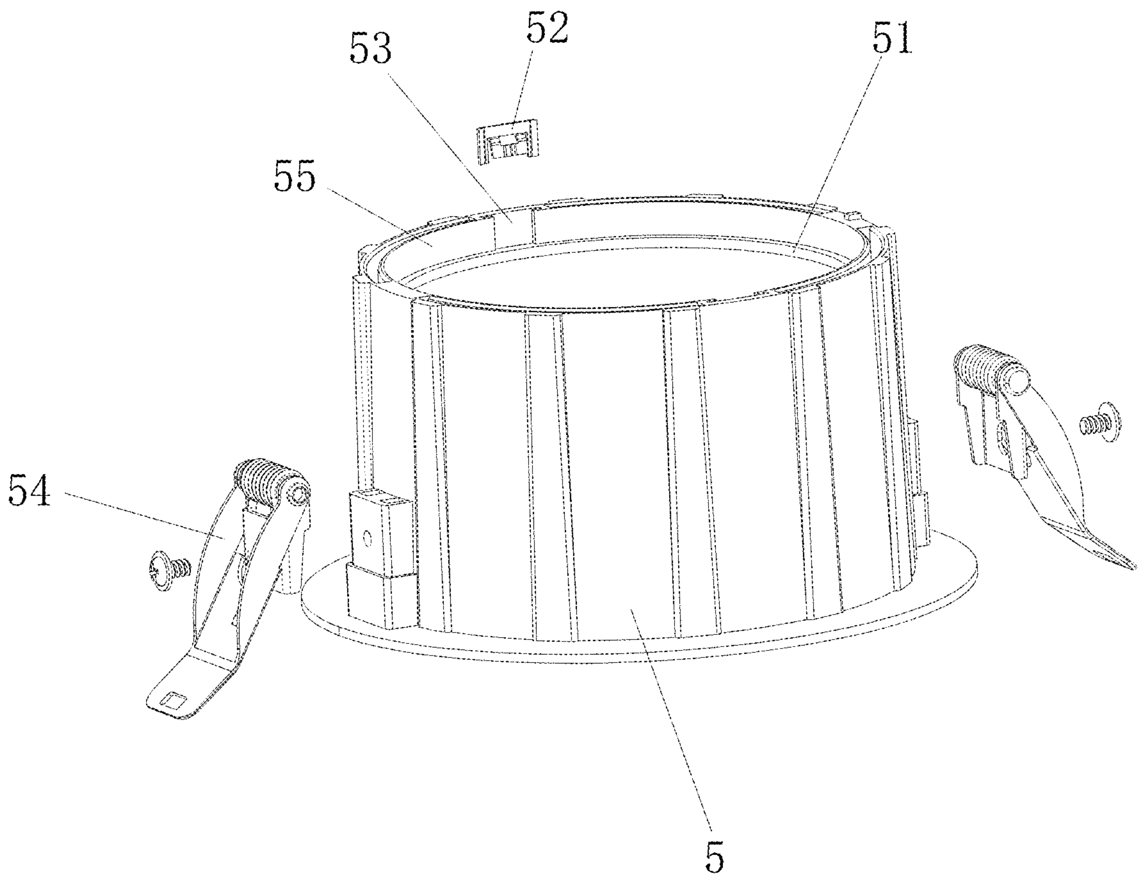
FIG. 5 is an exploded structural schematic diagram of a cylindrical body of the present disclosure.
Figure 6:
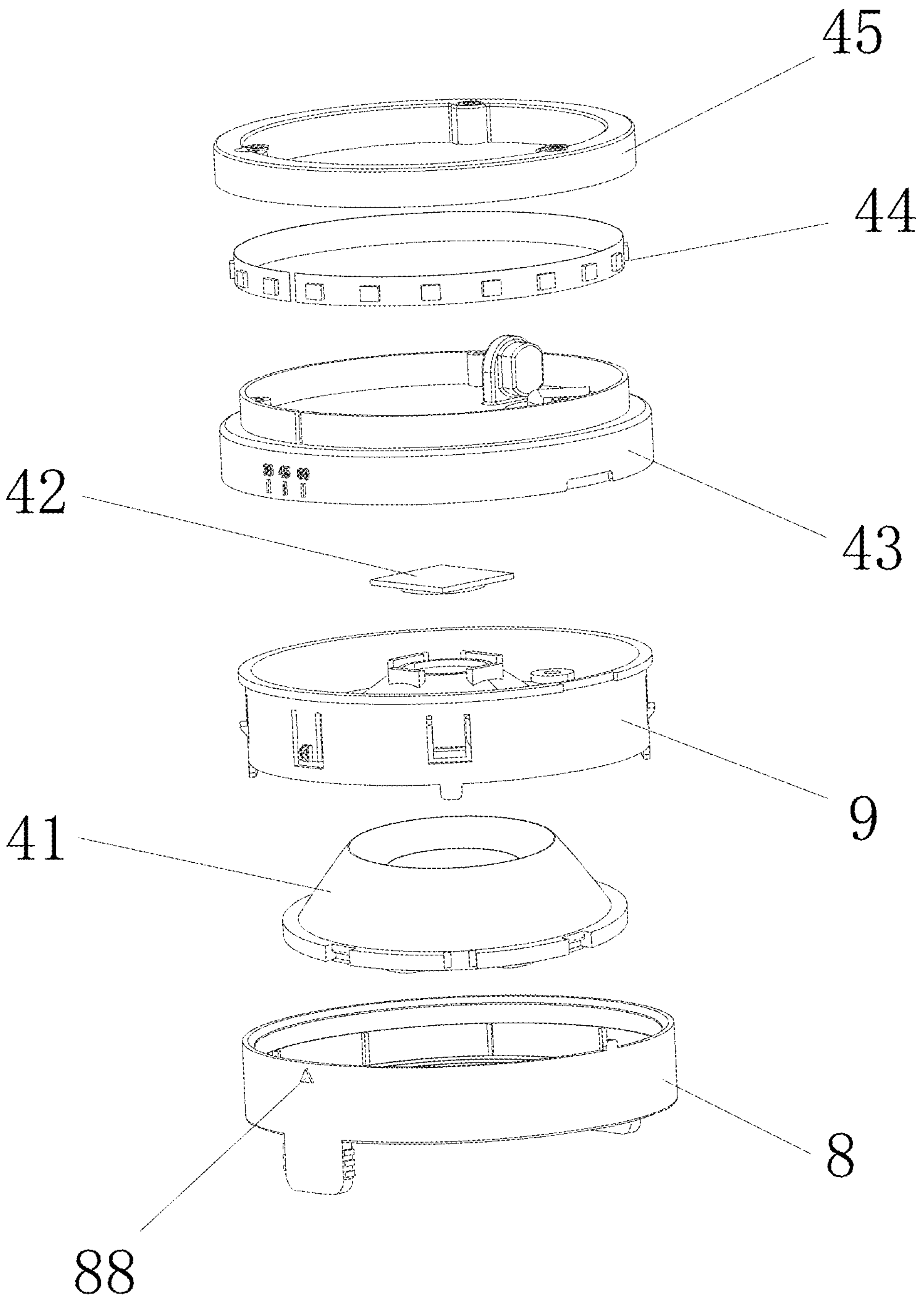
FIG. 6 is an exploded structural schematic diagram of a lamp body of the present disclosure.
Figure 7:
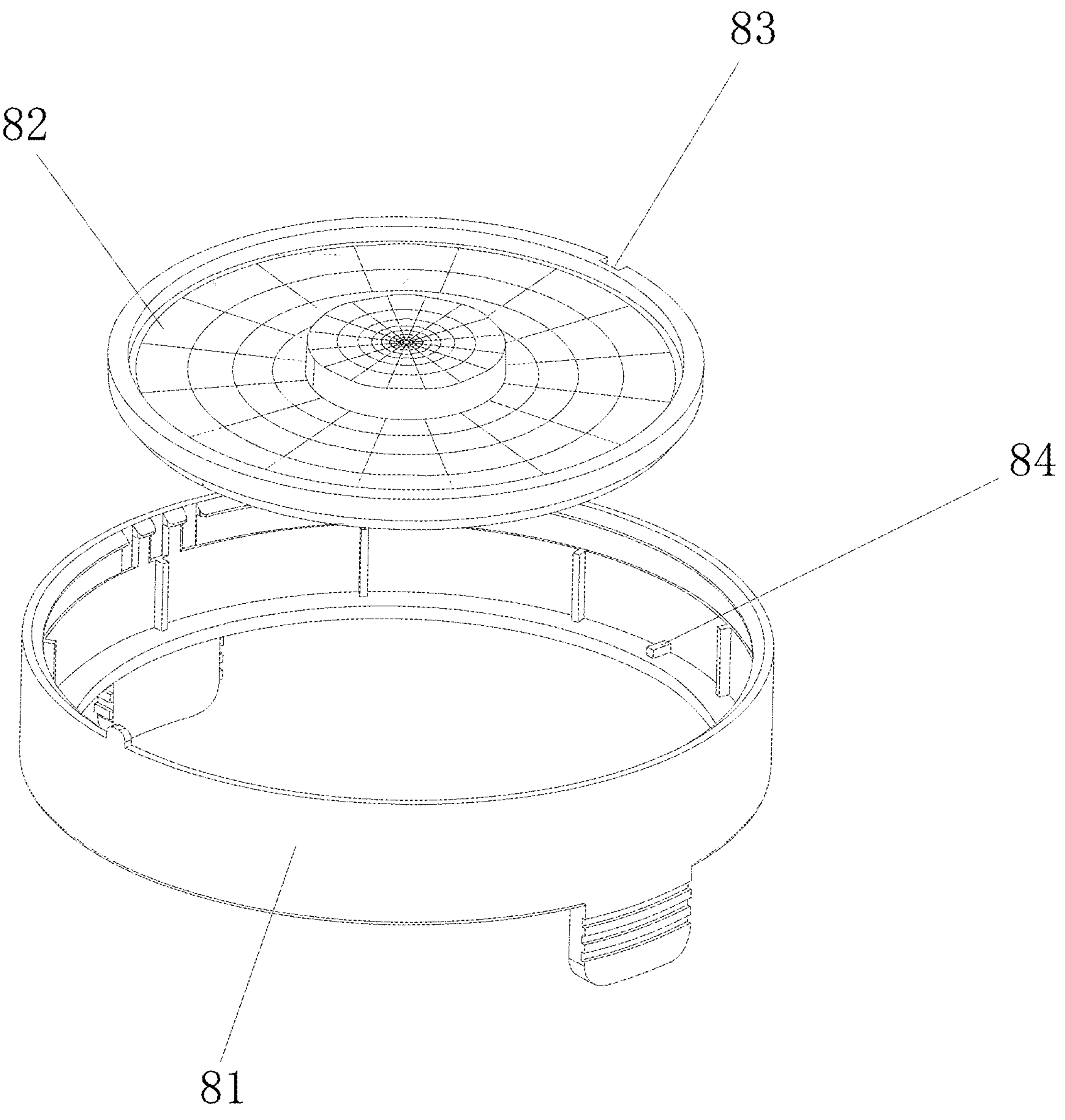
FIG. 7 is an exploded structural schematic diagram of a rotating lens body of the present disclosure.
Figure 8:
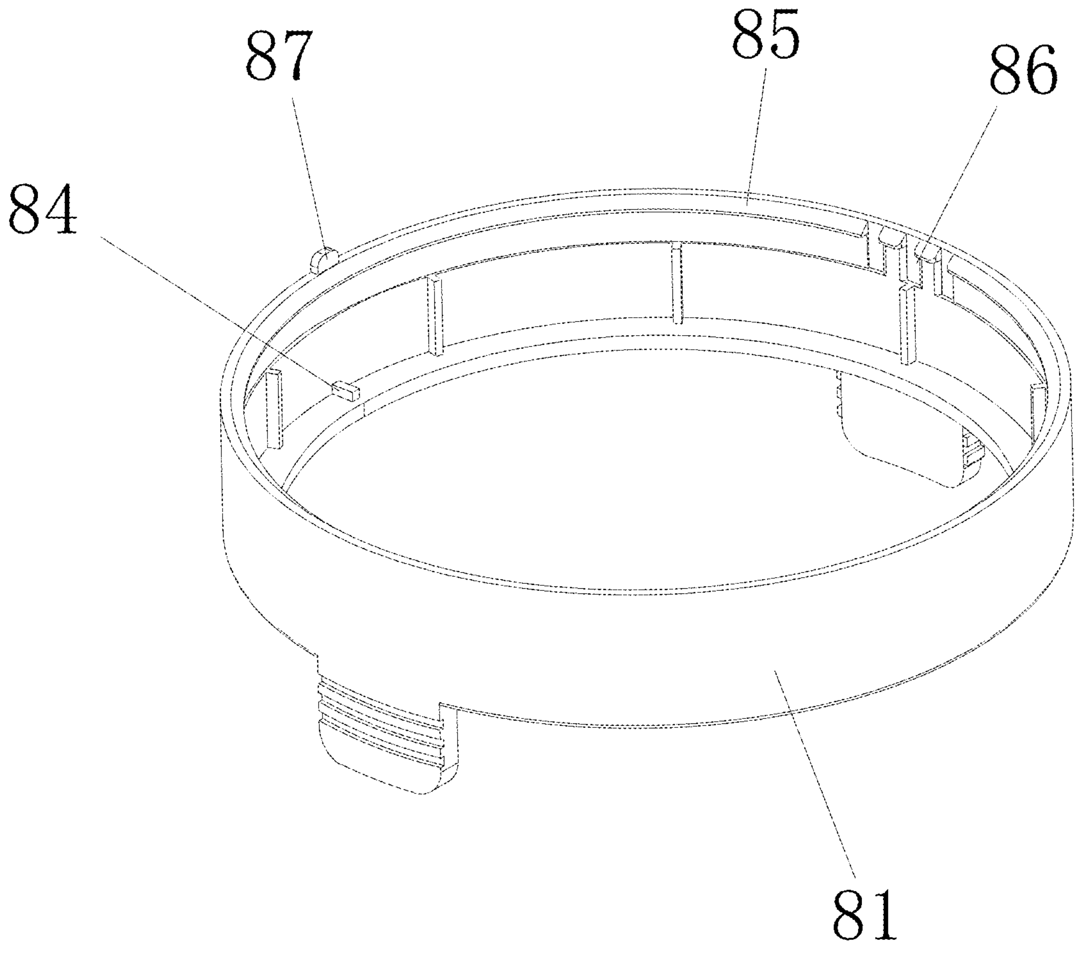
FIG. 8 is a schematic structural diagram of a rotating cup of the present disclosure.
Figure 9:
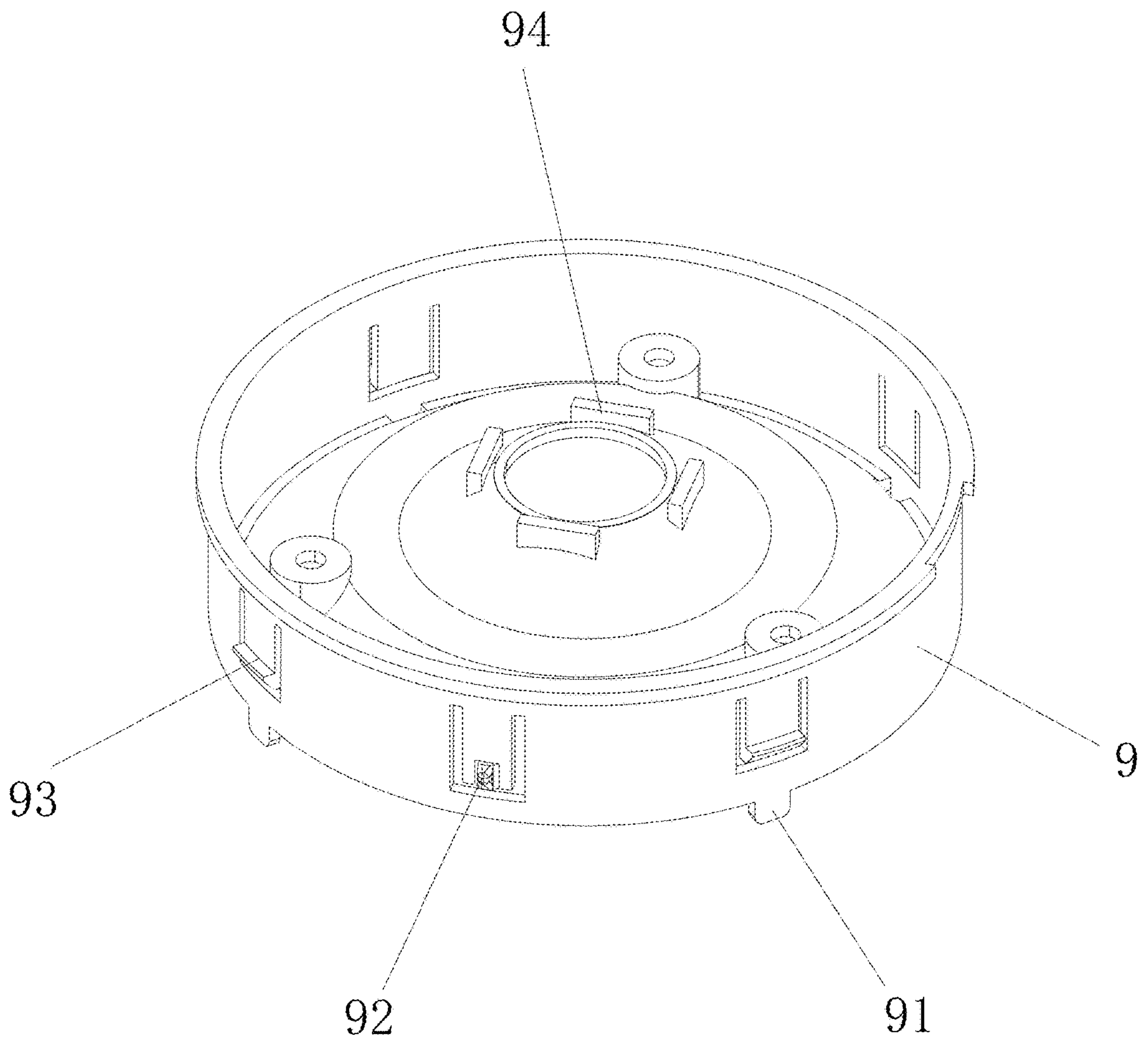
FIGS. 9 and 10 are schematic structural diagrams of a reflection cup of the present disclosure.
Figure 10:
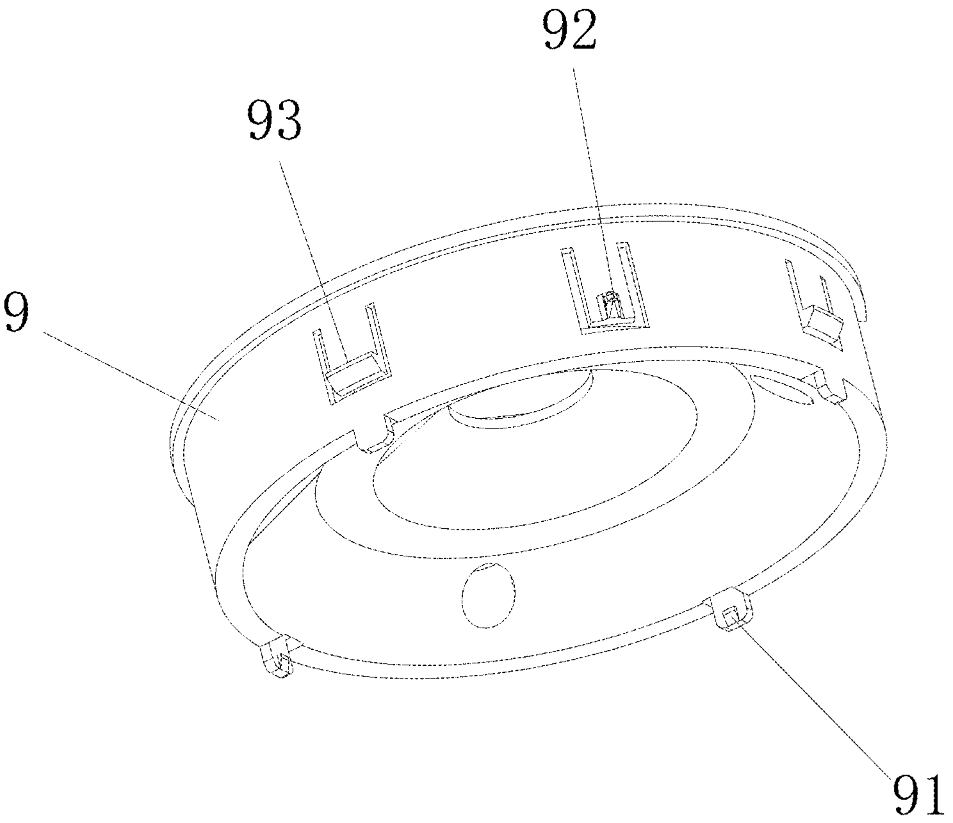
Figure 11:
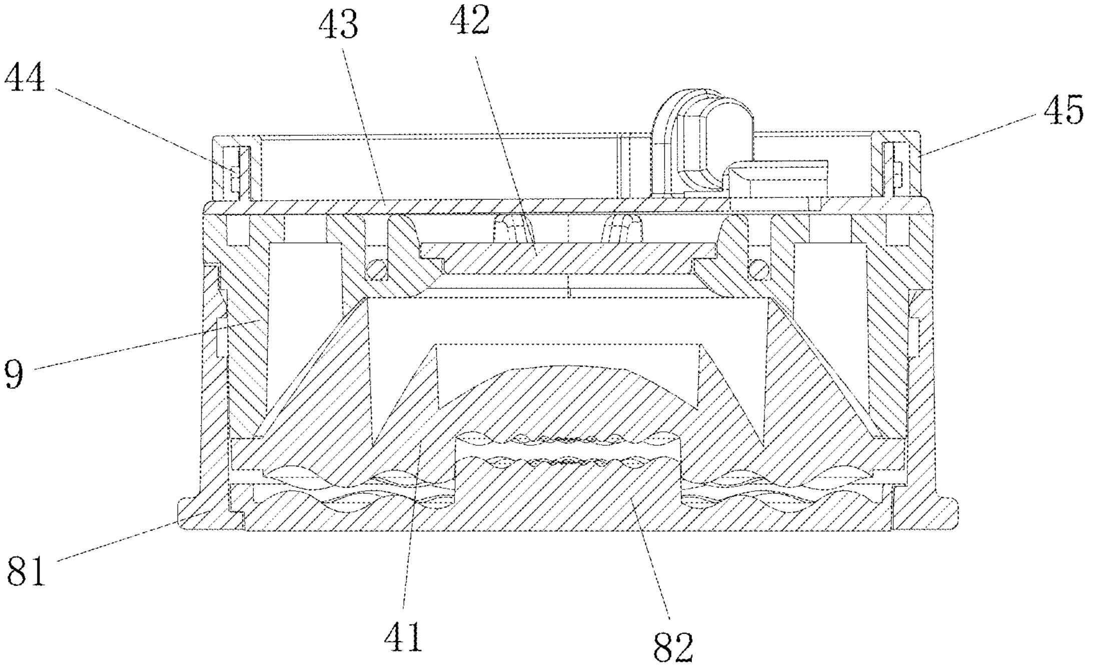
FIG. 11 is a schematic cross-sectional structural diagram of a lamp body of the present disclosure.
Figure 12:
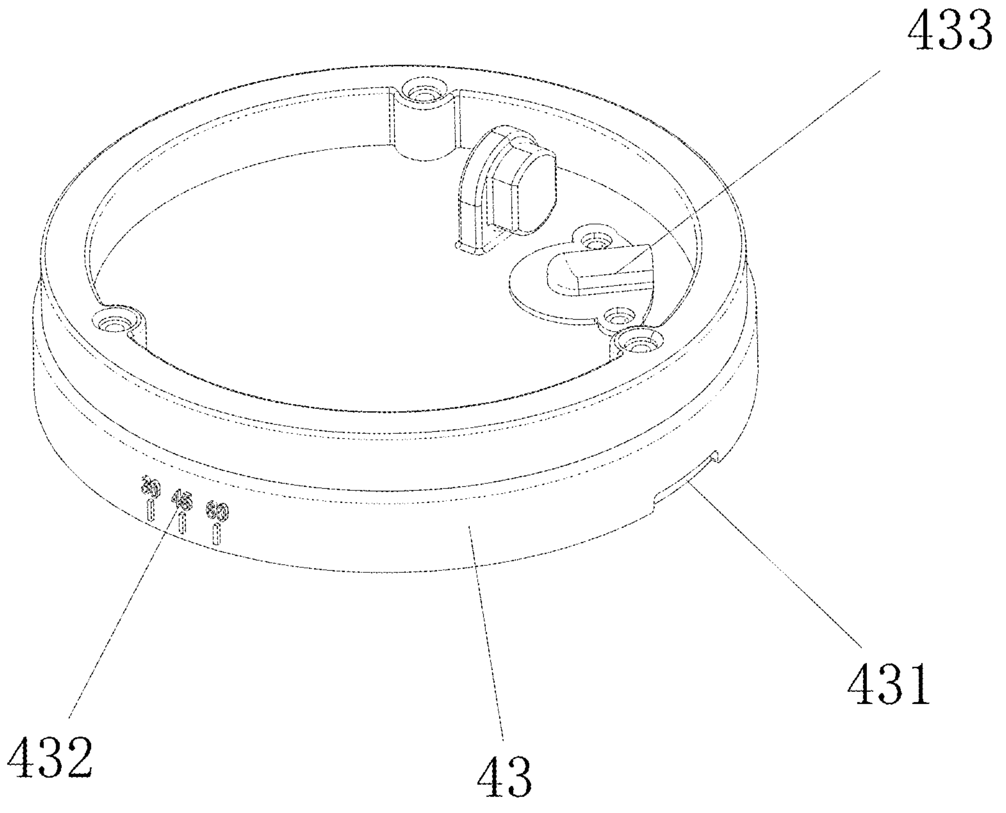
FIG. 12 is a schematic structural diagram of a heat sink of the present disclosure.

The two ends 61, 62 of the connecting member 6 are connected to the rotatable disk 7 and the lamp body 4 through friction pivots 3, 3', respectively, achieving the installation of the lamp body 4 on the cylindrical body 5. By adjusting the tilt angle of the lamp body 4 via the second friction pivot 3' and utilizing the interaction between the connecting member 6 and the first friction pivot 3, the lamp body 4 is allowed to move up and down relative to the rotatable disk 7 and the cylindrical body 5, altering the distance between the bottom surface of the lamp body 4 and that of the cylindrical body 5, thereby enabling the adjustment of an anti-glare depth H. Anti-glare depth is typically used to describe a luminaire's ability to limit direct glare through physical structural design, ensuring light is distributed within a specific range to prevent the human eye from directly viewing high-brightness light sources or experiencing discomfort. The greater the depth, the more times light is blocked or reflected, resulting in stronger glare control. As shown in FIG. 2, the anti-glare depth H described herein is defined as the distance between the bottom surface of the lamp body 4 and the bottom surface of the cylindrical body 5.

In the present disclosure, the connecting member 6 may be utilized to further lower the lamp body 4 beyond the cylindrical body 5, positioning at least a portion of the lamp body 4 below the bottom surface of the cylindrical body 5. In this configuration, the lamp body 4 may be rotated in a vertical plane around the second friction pivot 3' to adjust an illumination angle of the lamp body 4, enabling the downlight to achieve wall-washing lighting. The illumination angle of the lamp body 4 may also be adjusted via the first friction pivot 3. In other words, the illumination angle of the lamp body 4 may be adjusted within the vertical plane by combining the adjustments from both the first friction pivot 3 and the second friction pivot 3'.

After adjusting the illumination angle of lamp body 4 via the first friction pivot 3 and/or the second friction pivot 3', the lamp body 4 may further be rotated horizontally by utilizing the rotatable disk 7 as described above to adjust an illumination direction of the lamp body 4, thereby achieving a wider range of applications of the downlight.

Specifically, a plurality of friction teeth 71 (also referred to as damping teeth or friction protrusions) are densely provided on a circumference of the rotatable disk 7. The side wall 55 of the cylindrical body 5, positioned above the limiting ring 51 and corresponding to the circumference of the rotatable disk 7, is recessed inward to form a groove 53. A damping elastic sheet 52 corresponding to the friction teeth 71 is disposed within the groove 53. The damping elastic sheet 52 protrudes outward beyond the side wall 55 to abut against the friction teeth 71. The interaction between the damping spring sheet 52 and the friction teeth 71 generates damping or frictional resistance during rotation of the disk, which not only ensures the stability of the illumination direction after adjustment but also offers feedback during adjustment.

Embodiment 2

This embodiment differs from Embodiment 1 in that: Specifically, the lamp body 4 includes a heat sink 43; a reflection cup 9 is connected to the bottom of the heat sink 43; and the reflection cup 9 is connected to the heat sink 43 by screws. Four light source plate positioning blocks 94 are provided at an upper inner portion of the reflection cup 9 to limit a light source plate 42. The light source plate 42 is provided within the light source plate positioning blocks 94. A power cord 1 is connected to the light source plate 42. Four inner-lens buckles 91 are provided on a circumference of a lower end of the reflection cup 9. An inner lens 41 is mounted to the reflection cup 9 through the inner lens buckles 91. The reflection cup 9 is further connected to a rotating lens body 8. The rotating lens body 8 includes a rotating cup 81 capable of horizontally rotating. An outer lens 82 corresponding to the inner lens 41 is provided inside the rotating cup 81, and a first limiting groove 83 is provided on a circumference of the outer lens 82. A first limiting block 84 corresponding to the first limiting groove 83 is connected to the rotating cup 81, and the limiting of the outer lens 82 to the rotating cup 81 is achieved through the engagement of the first limiting block 84 with the first limiting groove 83. When a concave-convex region of a lower surface of the inner lens 41 aligns with a concave-convex region of an upper surface of the outer lens 82, light is compensated with a portion of light from the inner lens 41 after passing through the outer lens 82, resulting in collimated light emission. By rotating the outer lens 82, a relative position of the concave-convex region on the outer lens 82 is altered, causing misalignment with the concave-convex region on the lower surface of the inner lens 41. As a result, the light undergoes two refractions, and the light-emitting angle is reduced. In this way, it is possible to achieve a transition from a narrow beam to a medium beam without changing the physical length of a lamp, thereby meeting lighting requirements of different scenarios.

By adopting the above technical solution, the rotating cup 81 is rotated horizontally, so that the outer lens 82 is driven to rotate relative to the inner lens 41, thereby enabling the adjustment of the light-emitting angle.

Specifically, an upper end of an inner wall of the rotating cup 81 is provided with a rotating cup buckle 85, and a circumference of the reflection cup 9 is provided with a plurality of reflection cup buckles 93 corresponding to the rotating cup buckle 85.

By adopting the above technical solution, the rotating cup 81 is connected to the reflection cup 9 through the engagement of the rotating cup buckle 85 with the reflection cup buckles 93, enabling the rotating cup 81 to rotate relative to the reflection cup 9.

Specifically, the inner wall of the rotating cup 81 is provided with a plurality of feedback grooves 86, and the circumference of the reflection cup 9 is provided with feedback protrusions 92 corresponding to the feedback grooves 86.

By adopting the above technical solution, the engagement of the feedback protrusions 92 with the feedback grooves 86 provides limiting, which not only ensures the stability of the light-emitting angle after adjustment but also offers feedback during adjustment.

Specifically, a second limiting block 87 is disposed at the upper portion of the rotating cup 81, and a second limiting groove 431 corresponding to the second limiting block 87 is provided on the heat sink 43.

By adopting the above technical solution, the rotational range of the rotating cup 81 is limited.

Specifically, angle marks 432 are provided on a circumference of the heat sink 43, and indicating arrows 88 corresponding to the angle marks 432 are provided on the rotating cup 81.

By adopting the above technical solution, it facilitates a quick adjustment to a required light-emitting angle.

Embodiment 3

This embodiment differs from Embodiment 2 in that: Specifically, a nightlight light source strip 44 is connected to the circumference of the upper end of the heat sink 43. Additionally, a light guide ring 45 enclosing the nightlight light source strip 44 is connected to the heat sink 43.

By adopting the above technical solution, the downlight is provided with nightlight functionality.

Embodiment 4

This embodiment differs from Embodiment 1 in that: Specifically, the light source plate is connected to a power cord, an inner top of heat sink is connected to a power cord holder, and the power cord is fixed to the power cord holder.

By adopting the above technical solution, the power cord 1 is fixed on the heat sink 43, this allows the power cord 1 to move synchronously with the heat sink 43 and the lamp body 4, thereby preventing detachment at a welding joint of the power cord 1 and the light source plate 42 when the lamp body 4 is pulled downward.

Embodiment 5

Further, a method for adjusting the downlight is provided by the present disclosure, including: altering a vertical position of the lamp body 4 via the connecting member 6 to adjust a distance between a bottom surface of the lamp body 4 and a bottom surface of the cylindrical body 5, thereby adjusting an anti-glare depth of the downlight; moving the lamp body 4 downward through the connecting member 4 until at least a portion of the lamp body is positioned beneath the bottom surface of the cylindrical body 5; rotating the lamp body 4 within a vertical plane by at least one of the friction pivots 3, 3' to adjust an illumination angle of the lamp body 4; rotating the lamp body 4 within a horizontal plane via the rotatable disk 7 to adjust an illumination direction of the lamp body 4; and rotating the rotating cup 81 to rotate the outer lens 82 relative to the inner lens 41, thereby changing a relative position of the outer lens 82 relative to the inner lens 41 to adjust a light emission angle of the lamp body 4.

The method includes:

- adjusting an anti-glare depth: pulling the lamp body 4 downward or pushing the lamp body 4 upward to adjust the position of the lamp body 4;
- adjusting an illumination angle: pulling the lamp body 4 downward to expose the lamp body 4 from the cylindrical body 5; rotating the lamp body 4 in a vertical plane (with the friction pivots 3, 3' serving as a rotating shaft of the lamp body 4) to adjust the illumination angle of the lamp body 4; and rotating the lamp body 4 in a horizontal plane (the lamp body 4 drives the rotatable disk 7 to rotate through the connecting member 6, with a central axis of the rotatable disk 7 as a rotating shaft) to adjust an illumination direction of the lamp body 4; and
- adjusting a light-emitting angle: rotating the rotating cup 81 to drive the outer lens 82 to rotate relative to the inner lens 41.

In summary, in the present disclosure, the installation and limiting of the rotatable disk 7 and the cylindrical body 5 are achieved through the upper cover 2 and the limiting ring 51. The two ends of the connecting member 6 are connected to the lamp body 4 and the rotatable disk 7 through friction pivots 3, 3', respectively, achieving the installation of the lamp body 4 on the cylindrical body 5. This allows the lamp body 4 to move up and down relative to the rotatable disk 7 and the lamp body 4, thereby enabling the adjustment of the anti-glare depth. In the present disclosure, the lamp body 4 may be rotated in the vertical plane to adjust the illumination angle of the lamp body 4, enabling the downlight to achieve wall-washing lighting. Additionally, the lamp body 4 also may be rotated in the horizontal plane to adjust the illumination direction of the lamp body 4, thereby achieving a wider range of applications. In the present disclosure, damping for the rotation of the rotatable disk 7 is provided by the engagement of the damping elastic sheets 52 with the friction teeth 71, which not only ensures the stability of the illumination direction after adjustment but also offers feedback during adjustment. In the present disclosure, the inner lens 41 is connected to the lower end of the reflection cup 9, and the reflection cup 9 is further connected to a rotatable rotating cup 81. The outer lens 82 is connected to the rotating cup 81. By rotating the rotating cup 81 horizontally, the outer lens 82 is driven to rotate relative to the inner lens 41, thereby enabling the adjustment of the light-emitting angle. In the present disclosure, the power cord holder 433 is connected to the inner upper portion of the heat sink 43 to fix the power cord 1 on the heat sink 43, preventing detachment at the welding joint of the power cord 1 and the light source plate 42 when the lamp body 4 is pulled downward. In the present disclosure, the nightlight light source strip 44 is connected to the circumference of the upper end of the heat sink 43. Additionally, the light guide ring 45 enclosing the nightlight light source strip 44 is connected to the heat sink 43, thereby providing the downlight with nightlight functionality.

While embodiments of the present disclosure have been shown and described, it will be understood by a person skilled in the art that various changes, modifications, substitutions, and alterations may be made herein without departing from the principles and spirit of the present disclosure, and the scope of the present disclosure is defined by the appended claims and their equivalents.

We claim:

1. A downlight, comprising a cylindrical body, wherein two springs are symmetrically connected to corresponding side surfaces of the cylindrical body; a lamp body is provided inside the cylindrical body; a limiting ring is provided at an upper interior portion of the cylindrical body; a rotatable disk is provided on a top of the limiting ring; the lamp body and the rotatable disk are connected through a connecting member; two ends of the connecting member are connected to the lamp body and the rotatable disk through corresponding friction pivots, respectively; an upper cover is connected to an upper portion of the cylindrical body, and the rotatable disk is rotatably positioned between the limiting ring and the upper cover.

2. The downlight according to claim 1, wherein a plurality of friction teeth are provided on a circumference of the rotatable disk, a side wall of the cylindrical body, positioned above the limiting ring and corresponding to the circumference of the rotatable disk, is recessed inward to form a groove, and an elastic sheet is disposed within the groove and protrudes outward beyond the side wall to abut against the friction teeth.

3. The downlight according to claim 1, wherein the lamp body comprises a heat sink; a reflection cup is connected to a bottom of the heat sink; a plurality of light source plate positioning blocks are provided at an upper inner portion of the reflection cup; a light source plate is provided within and limited by the light source plate positioning blocks; one or more inner-lens buckles are provided on a circumference of a lower end of the reflection cup; an inner lens is mounted to the reflection cup through the inner-lens buckles; and the reflection cup is further connected to a rotating lens body.

4. The downlight according to claim 3, wherein the rotating lens body comprises a rotating cup capable of horizontally rotating; an outer lens corresponding to the inner lens is provided inside the rotating cup; a first limiting groove is provided on a circumference of the outer lens; and a first limiting block corresponding to the first limiting groove is connected to the rotating cup.

5. The downlight according to claim 4, wherein an upper end of an inner wall of the rotating cup is provided with a rotating cup buckle, and a circumference of the reflection cup is provided with one or more reflection cup buckles corresponding to the rotating cup buckle.

6. The downlight according to claim 4, wherein the inner wall of the rotating cup is provided with one or more feedback grooves, and the circumference of the reflection cup is provided with feedback protrusions corresponding to the feedback grooves.

7. The downlight according to claim 4, wherein a second limiting block is disposed at an upper portion of the rotating cup, and a second limiting groove corresponding to the second limiting block is provided on the heat sink.

8. The downlight according to claim 4, wherein angle marks are provided on a circumference of the heat sink, and indicating arrows corresponding to the angle marks are provided on the rotating cup.

9. The downlight according to claim 3, wherein the light source plate is connected to a power cord, an inner top of the heat sink is connected to a power cord holder, and the power cord is fixed to the power cord holder.

10. A method for adjusting the downlight according to claim 1, comprising:

altering a vertical position of the lamp body via the connecting member to adjust a distance between a bottom surface of the lamp body and a bottom surface of the cylindrical body, thereby adjusting an anti-glare depth of the downlight.

11. The method of claim 10, further comprising:

moving the lamp body downward through the connecting member until at least a portion of the lamp body is positioned beneath the bottom surface of the cylindrical body; and rotating the lamp body within a vertical plane by at least one of the friction pivots to adjust an illumination angle of the lamp body.

12. The method of claim 11, further comprising:

rotating the lamp body within a horizontal plane via the rotatable disk to adjust an illumination direction of the lamp body.

13. The method of claim 10, wherein the lamp body comprises an inner lens and a rotating cup capable of horizontally rotating, an outer lens corresponding to the inner lens is provided inside the rotating cup; and the method further comprises:

rotating the rotating cup to rotate the outer lens relative to the inner lens, thereby changing a relative position of the outer lens relative to the inner lens to adjust a light emission angle of the lamp body.

* * * * *